Oct. 12, 1943.    E. L. ALLEN ET AL    2,331,287
CROSS BAR STRUCTURE FOR ENDLESS TRACKS
Filed Jan. 28, 1942    4 Sheets-Sheet 1

INVENTORS:
EDWIN L. ALLEN
HAROLD B. MUSTER
BY Hyde and Meyer
ATTORNEYS.

Oct. 12, 1943.  E. L. ALLEN ET AL  2,331,287
CROSS BAR STRUCTURE FOR ENDLESS TRACKS
Filed Jan. 28, 1942  4 Sheets-Sheet 2
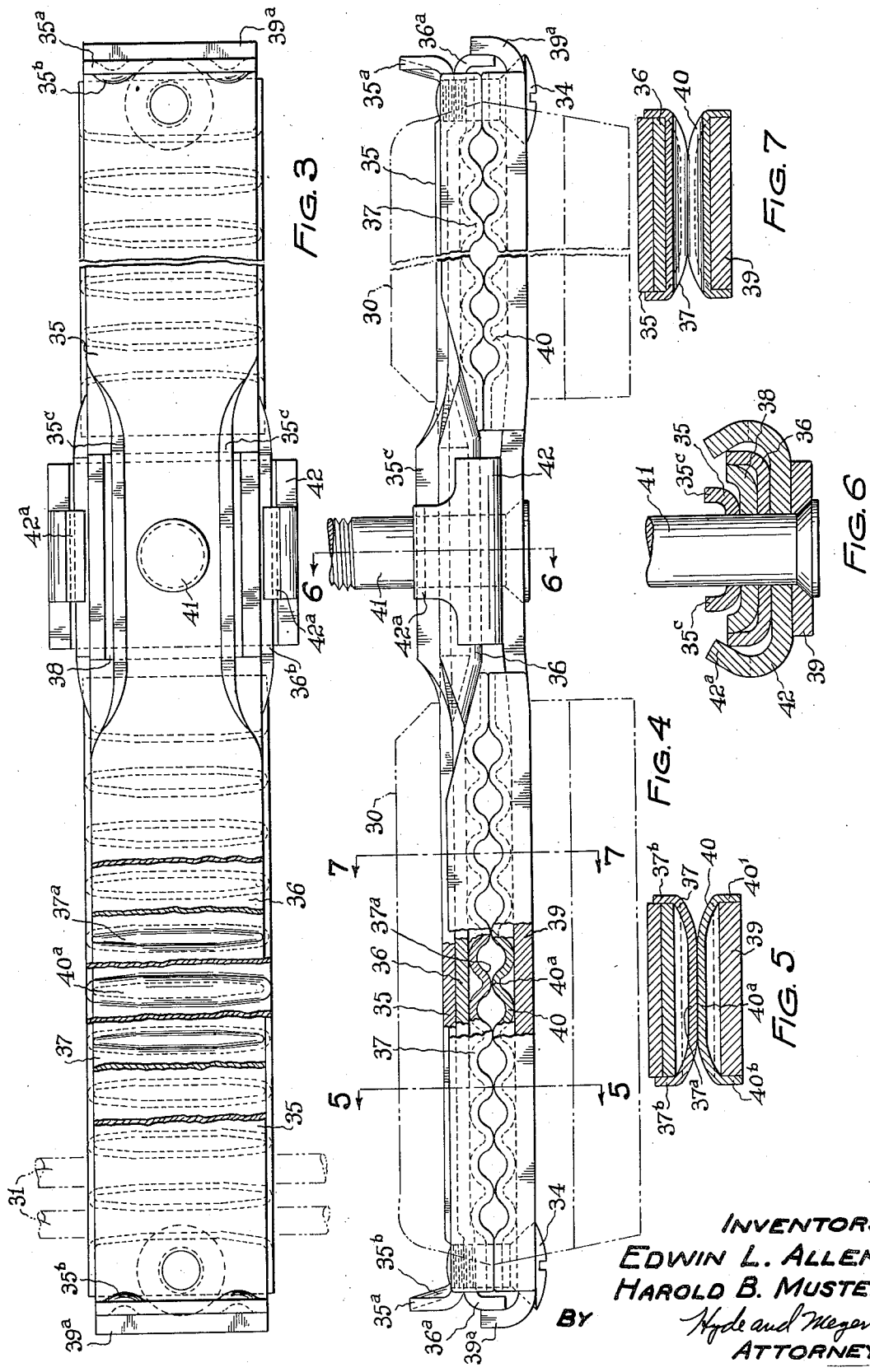
INVENTORS.
EDWIN L. ALLEN
HAROLD B. MUSTER
BY Hyde and Meger
ATTORNEYS.

Oct. 12, 1943.                E. L. ALLEN ET AL                 2,331,287
                CROSS BAR STRUCTURE FOR ENDLESS TRACKS
                Filed Jan. 28, 1942                 4 Sheets-Sheet 3
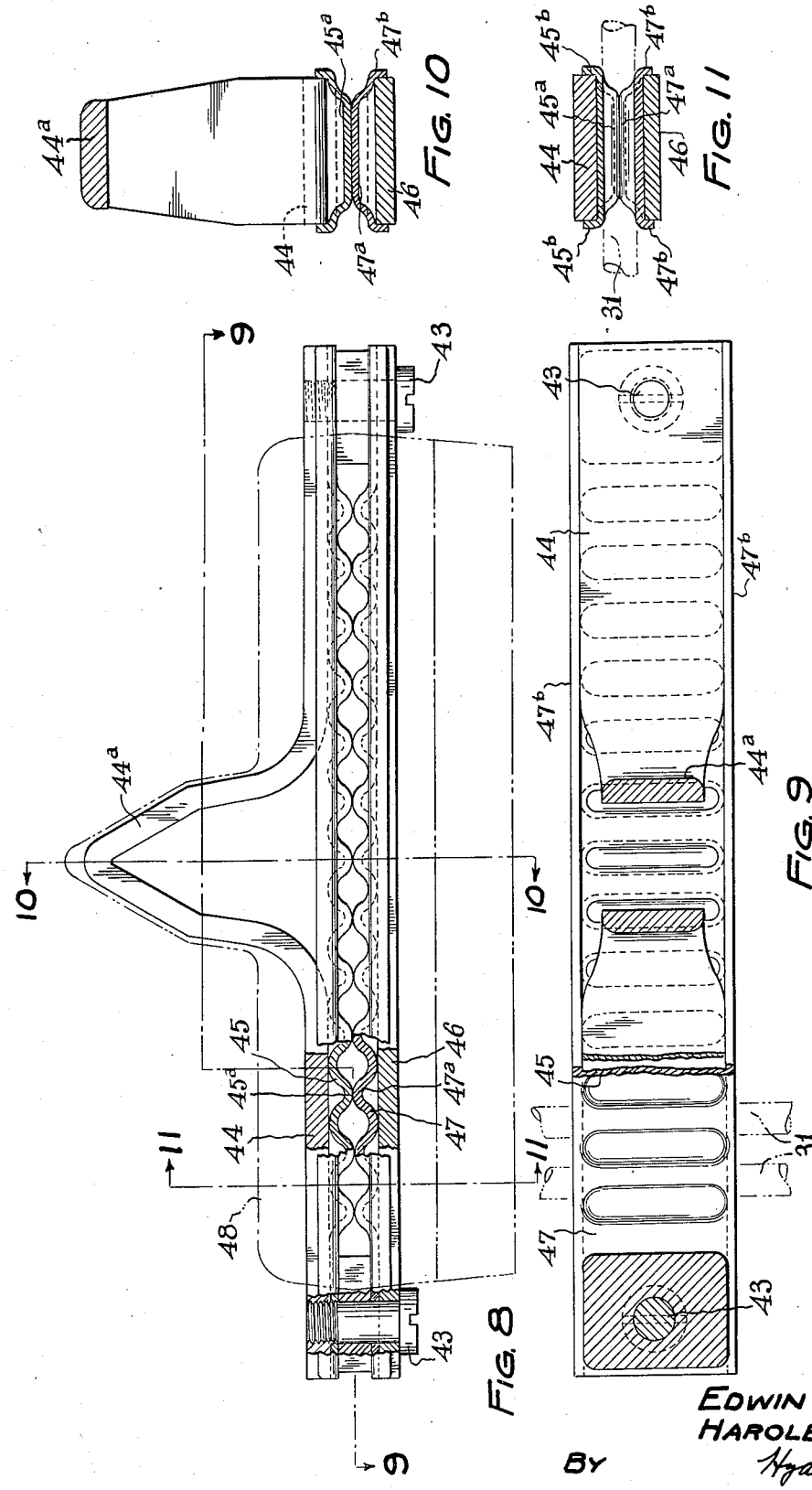
INVENTORS:
EDWIN L. ALLEN
HAROLD B. MUSTER
BY Hyde and Meyer
ATTORNEYS.

Oct. 12, 1943.   E. L. ALLEN ET AL   2,331,287
CROSS BAR STRUCTURE FOR ENDLESS TRACKS
Filed Jan. 28, 1942   4 Sheets-Sheet 4
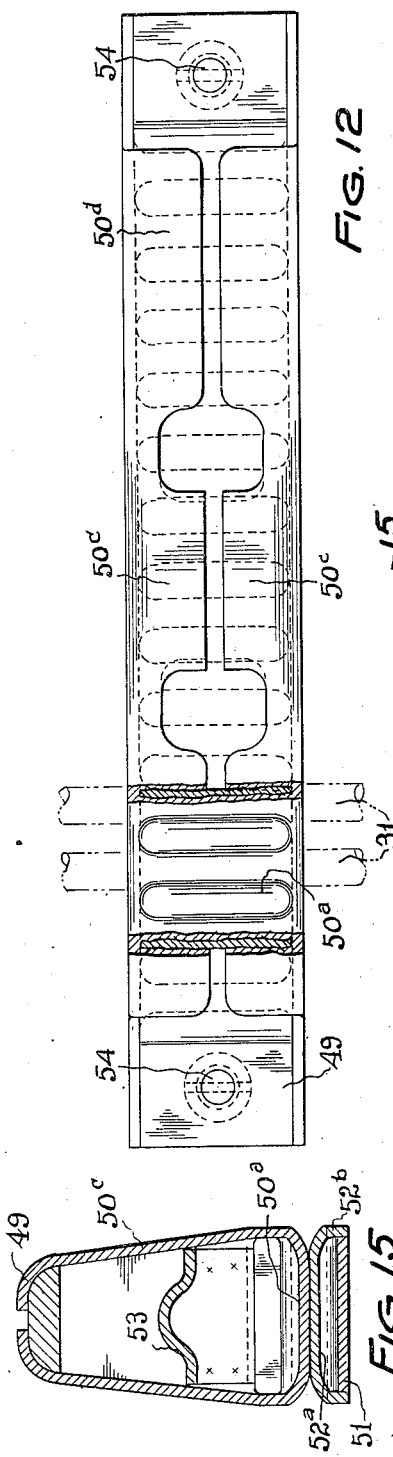
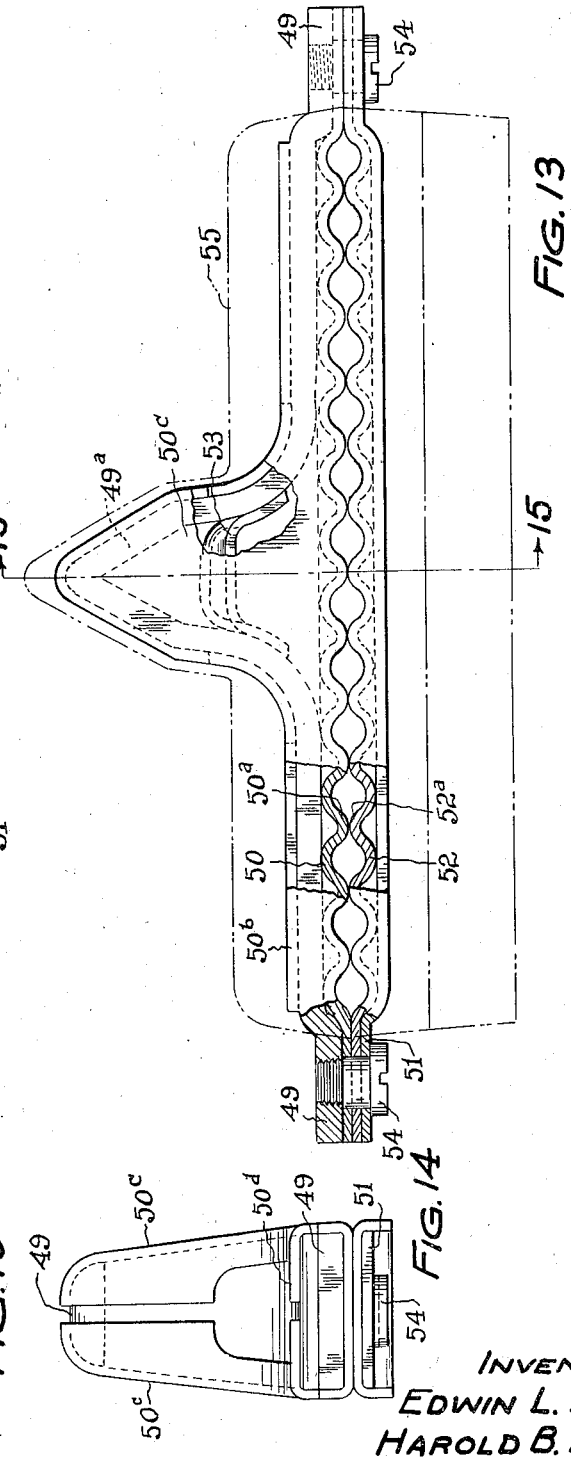
INVENTORS:
EDWIN L. ALLEN
HAROLD B. MUSTER
BY Hyde and Meyer
ATTORNEYS.

Patented Oct. 12, 1943

2,331,287

UNITED STATES PATENT OFFICE 2,331,287

CROSSBAR STRUCTURE FOR ENDLESS TRACKS

Edwin L. Allen and Harold B. Muster, Cleveland Heights, Ohio, assignors to Rudolph I. Schonitzer, Shaker Heights, Ohio Application January 28, 1942, Serial No. 428,523

5 Claims. (Cl. 305—10)

This invention relates to improvements in crossbar structures for flexible endless belt-like tracks for use on tractors, tanks and other vehicles of the self-laying track type.

An object of the present invention is to provide a crossbar structure made of metal plates which have been subjected to stamping, bending, welding and similar operations, to provide a crossbar structure which is suitable for mass production, which requires no machining, which has great uniformity as to size, which has hard wearing surfaces, and which is cheap to produce.

Among the specific objects of the present invention is to provide a crossbar structure wherein plate members have corrugations struck up from the metal of the plate adapted to lie between and to properly space parallel cables in the endless track.

Another object is to provide a crossbar structure built up of a plurality of plate members formed to provide the necessary strength with a minimum of weight and wherein a plurality of plates are welded together to reinforce each other.

Another object of the present invention is to provide a crossbar structure of the type described wherein the parts are of simple form, which are cheaply made and easily secured together.

Other objects and advantages of the present invention will be apparent from the accompanying drawings and description and the essential features will be set forth in the claims.

In the drawings, Fig. 1 is a fragmental side elevational view of a portion of a flexible endless track equipped with our invention.

Fig. 3 is a top plan view of one form of our improved crossbar with portions broken away to more clearly show the construction.

Fig. 4 is a side elevation of the bar of Fig. 3 with a portion broken away to show the construction.

Figs. 5, 6 and 7 are transverse sectional views taken along similarly numbered lines of Fig. 4.

Figs. 8 to 11 show a modified form of the device wherein Fig. 8 is a side elevational view partly broken away to show the construction, Fig. 9 is a view partly in plan and partly in section taken along the line 9—9 of Fig. 8, and Figs. 10 and 11 are transverse sectional views taken along similarly numbered lines of Fig. 8.

Figs. 12 to 15 show a second modification wherein Fig. 12 is a top plan view partly broken away to better show the construction, Fig. 13 is a side elevational view of the device of Fig. 12 with parts broken away, Fig. 14 is an end view of the device of Fig. 13, and Fig. 15 is a transverse sectional view taken along the line 15—15 of Fig. 13.

Our improved crossbar structure is intended for the same type of use as the crossbars 12 and 12' shown in United States Patent No. 2,107,490 granted February 8, 1938 to Robert Mayne, although they are not necessarily restricted to exactly the type of track there described. In other words the track need not be formed of an endless rubber belt and the track is not necessarily composed of two parallel endless belts but may comprise a single width of belt as shown in the modified forms herein disclosed in Figs. 8 to 15.

Figure 1:
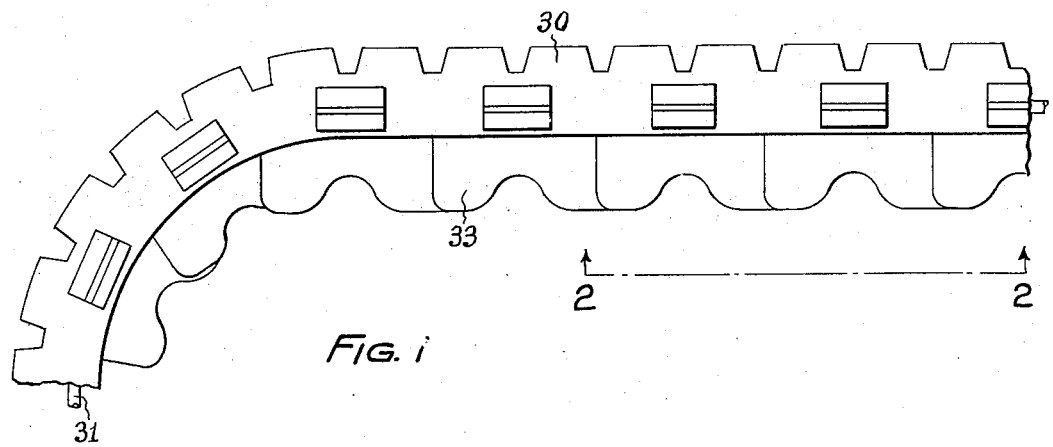
Figure 2:
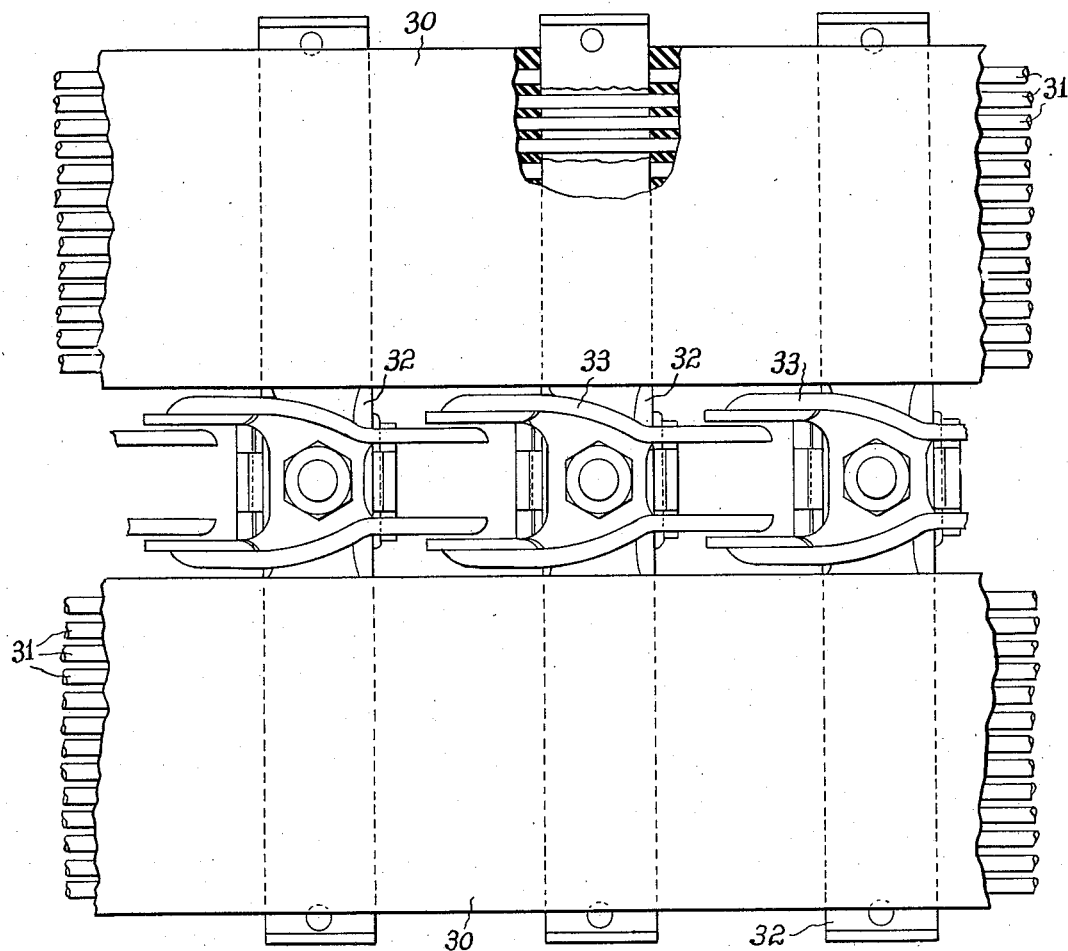
Fig. 2 is an enlarged fragmental bottom plan view of a portion of Fig. 1, taken from the position of the line 2—2 of Fig. 1.

Referring to Figs. 1 and 2, the flexible endless track comprises a pair of spaced vulcanized rubber tread bands 30 preferably but not necessarily continuous, which are reinforced by laterally spaced parallel strands of wire cable 31 which extend longitudinally of the track. This provides a smooth running tread which increases traction, reduces noise and vibration, and by the enclosure of the cables prevents corrosion thereof. All of the strands of the cable are attached at spaced intervals to metal crossbars 32 having suitable means provided for receiving and spacing the cables 31. This invention relates to improvements in the structure of these crossbars 32.

In one form of the device shown there is included a series of guides 33 secured to the crossbars 32 in the space between the flexible tracks 30 for the purpose of keeping the track in longitudinal alinement and to provide means for engagement with a driving sprocket. A similar construction is shown at 15 in the above mentioned Mayne patent and certain portions of the present structure are designed to coact with similar track guide members.

The crossbar shown in Figs. 3 to 7 comprises upper and lower subassemblies secured together by the countersunk bolts 34. The upper subassembly comprises an upper plate 35, an intermediate plate 36 and two cable spacing plates 37. The upper plate 35 is of substantially the full width and length of the crossbar and has its ends flanged upwardly at 35a, reinforced by the ribs 35b to facilitate the attachment of grousers to obtain better traction in mud and other conditions of a similar nature. At the center of the crossbar the side edges of this plate are bent inwardly and upwardly as indicated at 35c to form a pair of upstanding parallel abutments adapted to act as positioning means for a guide 33 which may be of a construction as shown in our copending application Serial No. 409,394, filed September 3, 1941. The plate 36 has end flanges 36a turned downwardly for strengthening purposes and to coact with the lower subassembly to close the end of the crossbar. At its center the plate 36 is flared outwardly and flanged upwardly as at 36b to reinforce a driving member later described. At the center of the crossbar between plates 35 and 36 lies a plate 38 of shallow U-form having upturned edge flanges lying within the flanges of plate 36 to further reinforce the structure at this point.

The cable spacing plates 37 lie one on either side of the center of the crossbar. These plates have a series of parallel corrugations 37a stamped up from the metal of the plate and adapted to lie between the cables 31. It will be noted in the various views that these corrugations extend intermediate the marginal edges of the crossbar and merge into a common plane at the marginal edges. This gives rounded ends to the corrugations at the place where the cables enter and leave the recesses between the corrugations and avoids damage to the cables. Preferably the plates 37 have their marginal edges which extend transversely of the track flanged upwardly as at 37b for stiffening purposes. These flanged edges lie alongside of and embrace the plates 35 and 36 as best seen in Figs. 5 and 7.

At its central portion the upper subassembly carries a driving plate 42 generally U-shape in form and having upstanding tongues 42a providing surfaces for engaging a driving sprocket. These tongues 42a as best seen in Fig. 6, are reinforced by the members 36 and 38 previously described.

The lower subassembly comprises a bottom plate 39 and two cable spacing plates 40. The plate 39 extends the full length and width of the crossbar and has end flanges 39a turned upwardly which engage and coact with the flanges 36a. The cable spacing plates 40 are alike and complementary to the plates 37 already described and having the corrugations 40a registering with the corrugations 37a of the upper subassembly. Taken together the troughs between corrugations 37a and 40a completely surround and embrace the cables 31 and hold them properly spaced. The plates 40 preferably have edge flanges 40b for stiffening purposes which lie alongside of and embrace the plate 39. At its central portion the lower subassembly has secured thereto an upstanding stud bolt 41 which passes through the lower and upper subassemblies and extends above the crossbar for the attachment of the track guides 33 previously described.

The parts comprising each subassembly are preferably first secured to each other by welding and then these two subassemblies are secured in proper position on the cables 31 by the bolts 34 which are threaded into suitable openings in the plates 35 and 36. The upper subassembly is of course provided with a central hole to receive the bolt 41. A plurality of crossbars are secured in proper position on the cables 31 and then the cables and crossbars are molded into the rubber tracks as indicated by the dot-dash lines 30 of Fig. 4.

The modification of Figs. 8 to 11 is intended for use with a different type of track comprising one endless rubber tread with guiding means at the center and drive sprockets which engage the outer ends of the crossbars.

Here again, each crossbar comprises upper and lower subassemblies secured together by the fillister head bolts 43. The upper subassembly comprises a main plate 44 and a cable spacing plate 45. The main plate extends across the entire top of the crossbar and has an upstanding reversely bent projection 44a at the center for engagement with guiding means for holding the track in longitudinal alinement. The cable spacing plate 45 has a plurality of parallel corrugations 45a which extend between the marginal edges of the plate and merge into the plane of the plate at the marginal edges, thus providing the rounded ends of the corrugations previously referred to for protecting the cables 31 against damage. The marginal edges of plate 45 are flanged upwardly at 45b to provide stiffness. These flanged edges embrace the sides of plate 44. The plates 44 and 45 are secured together, preferably by welding.

The lower subassembly comprises a main plate 46 and a cable spacing plate 47. The plate 47 has the corrugations 47a which are similar to the corrugations 45a and lie in registration therewith when the upper and lower subassemblies are secured together. The marginal edges 47b of plate 47 are flanged downwardly along the sides of the plate 46 as best seen in Figs. 10 and 11. The plates 46 and 47 are secured together, preferably by welding.

A plurality of crossbars comprising the upper and lower subassemblies just described are clamped on the cables 31 by means of the fillister head bolts 54. The crossbars and cables are then molded into the rubber track 55 as indicated in dot-dash lines in Fig. 13.

The upper and lower subassemblies are secured together by the bolts 43 which enter suitable tapped openings in plates 44. When a plurality of these crossbars have been properly clamped on the cables 31, the rubber track 48 is molded about them as indicated in dot-dash lines in Fig. 8. In this form of track the rubber fills the central portion of the projection 44a.

As best seen in Figs. 8 and 9, spacer blocks 56 drilled to receive bolts 43 are inserted at the ends of the crossbar to prevent bending of plates 45 and 47 and to give a firm structure to receive sprocket wheel thrust.

The modification shown in Figs. 12 to 15 resembles the modification of Figs. 8 to 11 in nearly all respects. The upper subassembly comprises a main plate 49 and a cable spacing plate 50 provided with the parallel corrugations 50a and having marginal portions 50b flanged upwardly alongside the plate 49. These two plates are welded together.

At its central portion the plate 49 is bent upwardly to provide the guide projection 49a. The side flanges 50b of the plate 50 have central portions 50c extending upwardly and closing the ends of the recess formed at 49a. The projection 49a is reinforced internally by the plate 53 which is welded into the position shown in Figs. 13 and 15. The construction is considerably strengthened by extending the marginal edges of plate 50 around to the upper side of plate 49 as indicated as 50d, Figs. 12 and 14.

The lower subassembly comprises a main plate 51 and a cable spacing plate 52 having the corrugations 52a and having marginal flanges 52b extending alongside the plate 51. Plates 51 and 52 are welded together.

What we claim is:

1. In a flexible endless track including spaced parallel cables extending lengthwise of the track and embedded in the material thereof, a crossbar extending transversely of the track and comprising two coacting plate members on opposite sides of said cables, at least one of said plates having corrugations adapted to lie between said cables to hold them properly spaced, each corrugation having smoothly inclined end walls sloping in the direction of cable extension and presenting surfaces adjacent said cables avoiding abrasion, and means securing said coacting plate members together.

2. In a flexible endless track including spaced parallel cables extending lengthwise of the track and embedded in the material thereof, a crossbar extending transversely of the track and comprising coacting generally parallel plate members welded together in mutually reinforcing relationship, one of said plate members having corrugations adapted to lie between said cables to hold them properly spaced, said corrugations being formed between the marginal edges of said one plate member leaving the marginal edges flat, and said other of said parallel plate members being welded to said flat marginal edges.

3. In a flexible endless track including spaced parallel cables extending lengthwise of the track and embedded in the material thereof, a crossbar extending transversely of the track and comprising coacting generally parallel plate members welded together in mutually reinforcing relationship, one of said plate members having projections integral therewith adapted to lie between said cables to properly space them, and one of said plate members having edge flanges embracing the other of said plate members to stiffen said crossbar.

4. In a flexible endless track including spaced parallel cables extending lengthwise of the track and embedded in the material thereof, a crossbar extending transversely of the track and comprising coacting generally parallel plate members welded together in mutually reinforcing relationship, one of said plate members having corrugations parallel to said cables and adapted to lie between said cables to hold them properly spaced, said corrugations extending intermediate the marginal edges of the crossbar and merging into substantially a common plane at said marginal edges, and said corrugated plate member having edge flanges embracing a parallel plate member.

5. In a flexible endless track including spaced parallel cables extending lengthwise of the track and embedded in the material thereof, a crossbar extending transversely of the track and comprising two coacting generally parallel plate members, one of said plate members having corrugations parallel to said cables and adapted to lie between said cables to hold them properly spaced, the other of said plate members having a reversely bent portion extending beyond the general plane of the crossbar to form a guide, and said corrugated plate member having integral parts closing the open ends of said reversely bent portion.

EDWIN L. ALLEN.
HAROLD B. MUSTER.

CERTIFICATE OF CORRECTION.

Patent No. 2,331,287.　　　　　　　　　　　　　　　　October 12, 1943.

EDWIN L. ALLEN, ET AL.

It is hereby certified that error appears in the printed specification of the above numbered patent requiring correction as follows: Page 2, second column, line 33, beginning with the words "A plurality of" strike out all to and including "in Fig. 13." in line 38, and insert this paragraph after "together." in line 75, same page and column; and that the said Letters Patent should be read with this correction therein that the same may conform to the record of the case in the Patent Office.

Signed and sealed this 1st day of February, A. D. 1944.

(Seal)　　　　　　　　　　　　　　　　　　　　　Henry Van Arsdale,
　　　　　　　　　　　　　　　　　　　　　Acting Commissioner of Patents.